Feb. 11, 1947.　　O. S. CAESAR　　2,415,460
MOTOR VEHICLE
Filed Oct. 7, 1944　　4 Sheets-Sheet 1
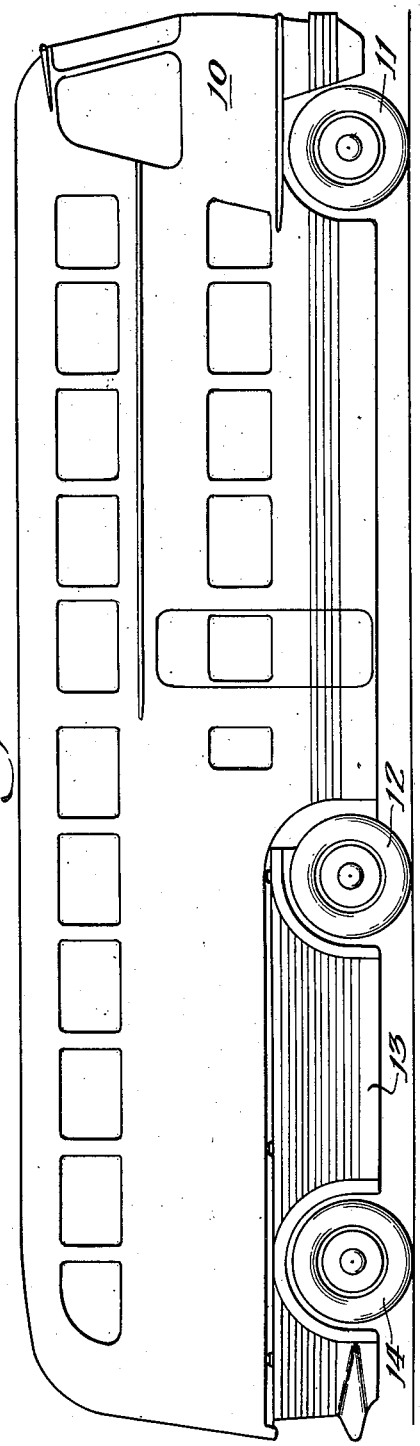
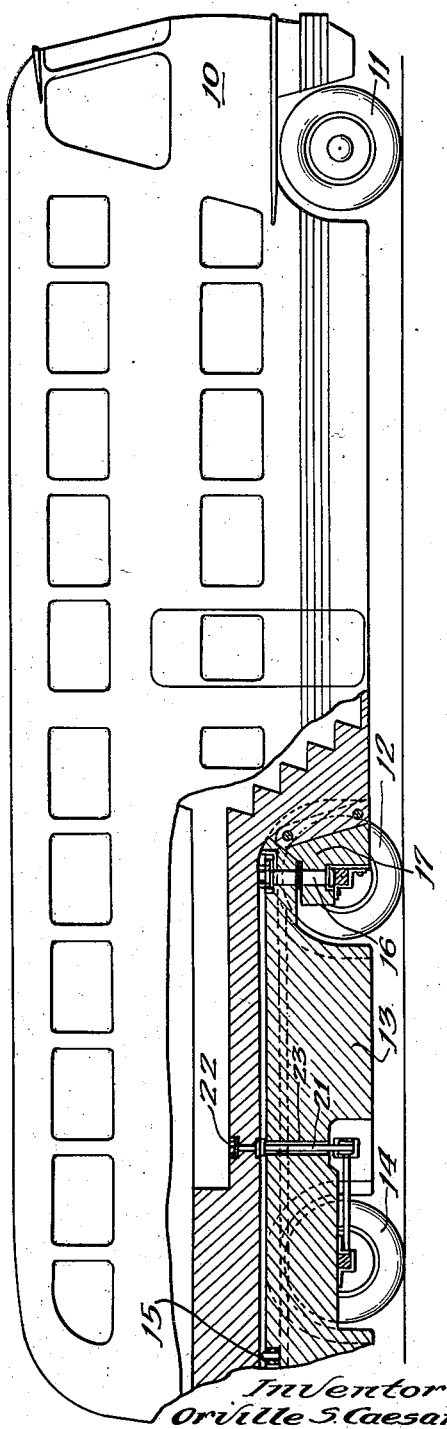
Inventor:
Orville S. Caesar
By Harold Olsen
Attorney Feb. 11, 1947.　　O. S. CAESAR　　2,415,460
MOTOR VEHICLE
Filed Oct. 7, 1944　　4 Sheets-Sheet 2
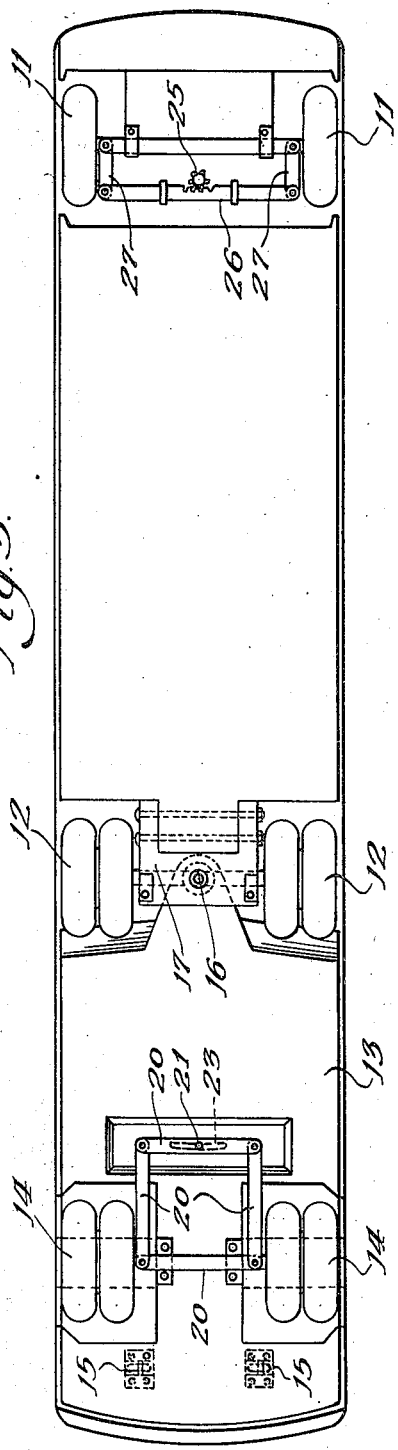
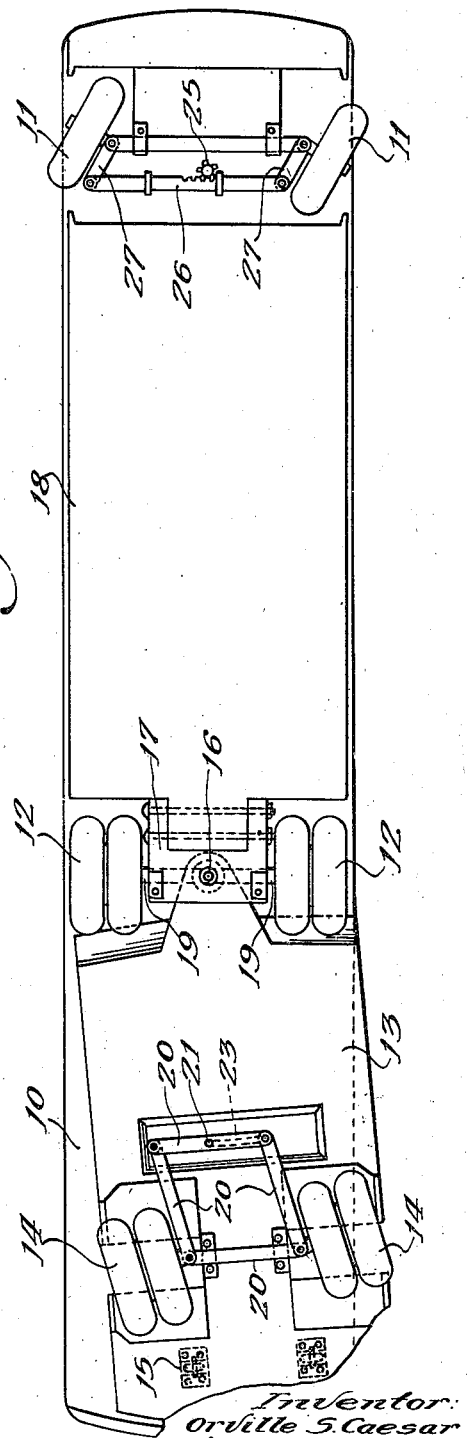
Inventor:
Orville S. Caesar
By Harold Olsen
Attorney.

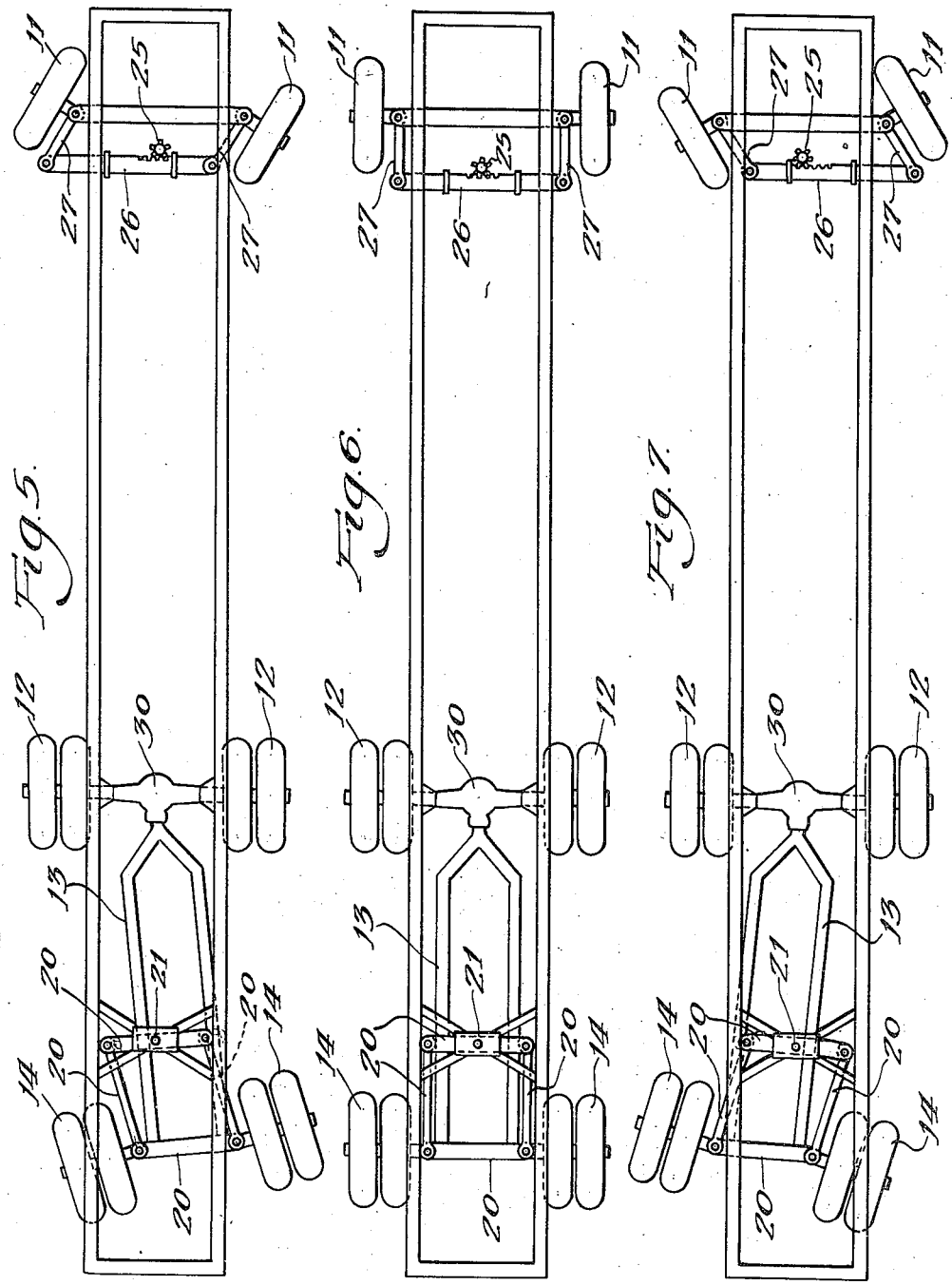

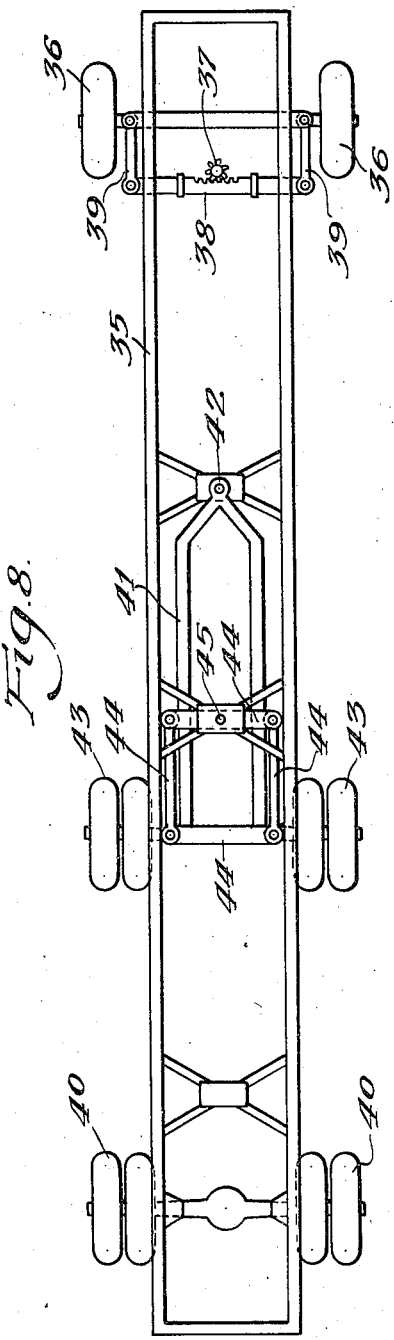
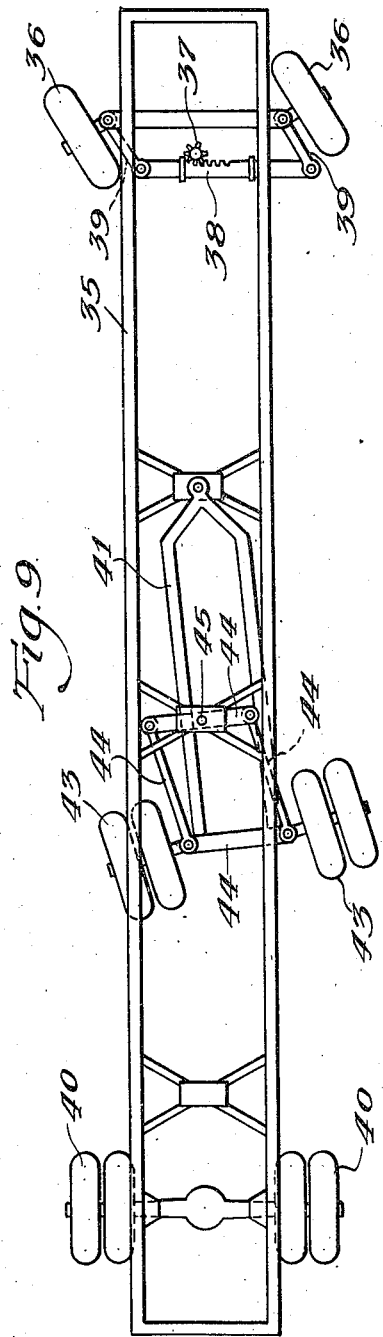

Patented Feb. 11, 1947

2,415,460

UNITED STATES PATENT OFFICE 2,415,460

MOTOR VEHICLE

Orville S. Caesar, Barrington, Ill., assignor to The Greyhound Corporation, Chicago, Ill., a corporation of Delaware Application October 7, 1944, Serial No. 557,599

1 Claim. (Cl. 280—80)

This invention relates to improvements in motor vehicles and particularly to an arrangement for facilitating the steering of motor vehicles of long wheel base.

Operators of motor vehicles used in interstate commerce, such as freight trucks, vans and passenger busses, have for a long time been faced with a serious problem in meeting the varying relations of the different States respecting the length of wheel base, load per axle, and the like. Because the requirements of the various States are so different, it has been necessary to build such vehicles so as to conform to the regulations of the greatest number of States which, however, means that vehicles so designed and constructed will not comply with the requirements of some of the other States.

It is an object of the present invention to lengthen the wheel base of motor vehicles to thereby increase the body capacity without, however, increasing the turning radius.

It is a further object of the invention to provide mechanism that will facilitate the steering of long wheel base units.

A further object of the invention is to provide a motor vehicle in which the distribution of the load per axle may be so made as to comply with the requirements of the majority of States and yet at the same time to facilitate the steering of such a vehicle.

Still another object of the invention is to provide a vehicle having a continuous undivided load or passenger carrying body, provided with supporting and tractive wheel structures which are separate and separable but pivotally connected.

A further object of the invention is to provide a vehicle having a relatively fixed truck member provided with steerable wheels and a pivoted truck member which is movable with respect to the body and which is also provided with steerable wheels.

Still another object of the invention is to provide a supporting structure for motor vehicle bodies including a pivoted truck having steerable wheels, in which said steerable wheels are automatically adjusted by relative movement between the truck member and the superposed portion of the body.

Still another object of the invention is to provide a motor vehicle body having a supporting truck member in relatively fixed position with respect thereto and a pivoted truck member with respect to which the body may move, or which may move with respect to the body, the fixed truck having steerable wheels, the movement of which will cause the body to turn with respect to the movable truck member and thereby automatically effect steering of the wheels on the last mentioned member.

Other objects of the invention and its advantages will be more fully brought out as the description proceeds.

In the accompanying drawings, I have illustrated a practical embodiment of the invention together with a modification thereof. It is to be understood that these drawings, which are more or less diagrammatic, are submitted for illustrative purposes only and that I do not intend to limit myself to the specific features disclosed therein, except as the same may be embraced within the scope of the appended claim.

Referring now to the drawings:

Fig. 1 is a view in side elevation of a motor vehicle, in this instance a passenger carrying bus, embodying my invention;

Fig. 2 is a view similar to Fig. 1, certain parts of the bus body being broken away and showing my novel trailer truck member in section;

Fig. 3 is a bottom plan view of a vehicle embodying my invention showing the relative position of the different sets of wheels when the vehicle is moving in a straight line;

Fig. 4 is a view similar to Fig. 3 showing the position of the wheels when the front steerable wheels are turned so as to turn the vehicle;

Figs. 5, 6 and 7 are diagrammatic views of the supporting trucks and their respective wheels; Fig. 6 showing the arrangement of the wheels when the vehicle is moving in a straight line; Fig. 5, the arrangement when the vehicle is turned in one direction; and Fig. 7, when the vehicle is turned in the opposite direction;

Fig. 8 is a diagrammatic view similar to Fig. 6 showing a different location of the pivoted truck member; and Fig. 9 is a diagrammatic view showing the relative position of the pivoted truck member when the front wheels are turned from a straight line.

In Fig. 1, I have illustrated, more or less diagrammatically, a multiple passenger vehicle commonly known as a bus. The body of the vehicle is designated by the reference character 10. It is provided with front wheels 11 and intermediate wheels 12. In this form of the invention, I have shown a rear pivoted truck member indicated generally by the reference numeral 13 which is provided with wheels 14.

My present invention resides in the provision of a pivoted trailer truck member such as 13 which is provided with wheels 14 having a steering mechanism presently to be described. In general, according to my invention, the pivoted trailer truck member 13 is movable with respect to the superposed portion of the body 10, suitable anti-friction rollers 15 being interposed to facilitate movement of one with respect to the other.

The trailer truck 13 is pivoted on a king bolt 16 journaled in a bracket 17 which is connected to the front truck 18, which, in turn, is rigidly connected to the superposed portion of the body 10. The mounting of the king bolt 16 on the bracket 17 and the relation of said bracket to the axle 19 for the wheels 12 is such that the pivoted truck 13 may have swinging movement in a horizontal plane as well as some vertical swinging movement which may be necessary when the vehicle is passing over rough and uneven ground.

The wheels 14 carried by the trailer truck member 13 are provided with a steering mechanism comprising a set of pivotally connected levers 20 by which the angular relationship between the said wheels and the trailer truck member 13 may be changed when the vehicle is steered to make a turn.

Steering of the said wheels 14 by the levers 20 is accomplished by a bolt or shaft 21 which is connected to the superposed part of the body structure as at 22, the said shaft or bolt extending through an arcuate slot 23 in the truck member 13, and is connected at its lower end to one of the levers 20.

The foregoing arrangement is such that whenever the angular relationship between the trailer truck member 13 and the superposed portion of the body is changed, as occurs when the vehicle is turning, the bolt or shaft 21 will operate upon the pivotally interconnected levers 20 in such a way as to change the angle of the wheels 14 with respect to said truck member 13.

As shown in the present illustrative embodiment of the invention, the front wheels 11 are provided with steering mechanism which may be of any usual or preferred construction. For purpose of illustration, I have shown a pinion 25 cooperating with a rack 26 which by connection to the links 27 effects steering of the said wheels 11. As will be well understood, the pinion 25 will be operated from the usual steering wheel located in a place within the body convenient to the driver. The operation of the mechanism thus far described is as follows:

When the vehicle is proceeding in a straight line as shown in the bottom plan view of Fig. 3, the sets of wheels follow in a straight line. If now the driver turns the steering wheel so as to turn the wheels 11 in the direction shown in Fig. 4, the result will be that the pivoted truck member 13 will assume the position shown in said Fig. 4. In turning to that position, the said truck member 13 moves angularly with respect to the superposed portion of the body 10. Any friction between the truck and the body is largely overcome by the provision of the anti-friction rollers 15.

This relative movement between the pivoted truck member 13 and the body 10 results in movement of the bolt or shaft 21 through the arcuate slot 23 so that by reason of the connection between said bolt or shaft to the pivotally connected levers 20, the wheels 14 on the truck member 13 are turned to the position shown in said Fig. 4.

Thus, it is apparent that in this illustrative embodiment of the invention, when the front wheels are manually turned, there is a resulting automatic turning of the pivoted truck 13 which, therefore, effects automatic steering of the wheels 14. It may, therefore, be said that a vehicle of my invention comprises a set of manually steerable wheels and a set of automatically steerable wheels, the latter being turned by the relative movement between a pivoted trailer truck and the superposed part of the vehicle body.

To make the operation of my invention entirely clear, I have added the diagrammatic illustrations comprising Figs. 5, 6 and 7. Fig. 6 shows the wheels all in alinement as when the vehicle is proceeding forwardly in a straight line. In these figures, I have identified the various sets of wheels and levers by the same reference characters as heretofore employed. For simplification, I have indicated by the reference character 30 a universal joint connection for the pivoted truck 13. This universal joint is shown as being located upon the axle for the wheels 12, but it is understood that the said joint may be otherwise located.

Fig. 5 is a diagrammatic view corresponding essentially to the showing of Fig. 4. In this view, the front wheels 11 have been turned by the steering mechanism comprising the pinion 25, a rack 26, and links 27, so as to cause the vehicle to turn to the right. It will be observed that in so doing, the pivoted trailer truck 13 has turned in the same direction, with the result that the steerable wheels 14 on said pivoted truck 13 are turned so as to track behind the front wheels 11.

Similarly, in Fig. 7, I have shown the position of the several sets of wheels when the front wheels 11 are steered so as to cause the vehicle to turn to the left. Here, it will be seen that such turning movement of the vehicle has caused the trailer truck member 13 to swing to the left, with the result that the steerable wheels 14 thereon are actuated to trail and track behind the front wheels 11.

By the arrangement above described, operating in the manner set forth, it is possible for me substantially to increase the over-all length of the wheel base of a motor vehicle without increasing its turning radius. This is a feature of great advantage as it enables vehicles of this sort to make sharp turns which are necessary when passing through city streets or making right angle turns upon the highway.

As a matter of actual calculation, I have determined that the wheel base may be so much lengthened as to provide carrying capacity in the body for forty-one passengers and yet the vehicle will turn on the same radius as one which is designed for only thirty-one passengers. The additional load thus provided for is taken care of by the additional set of wheels on the trailer truck member so that the unit as a whole will still comply with the requirements of the majority of the States as to load distribution per axle. Moreover, because of the provision of a trailer unit, although the body is continuous and undivided, the unit as a whole will be considered as having a wheel base equivalent to the length between the front wheels and the rear fixed wheels. Thus, in this respect, the unit as a whole will comply with the requirements of most of the States.

Also, by making the wheels 14 on the trailer truck member 13 steerable, I very considerably limit the extent of pivotal movement of the trailer with respect to the body. Furthermore, providing steering mechanism for the wheels 14 on the trailer truck, which mechanism is automatically operated by relative movement between the body and said truck, will considerably reduce the lateral drag upon the trailer wheels.

The relative location of the respective sets of wheels is a matter of choice, consideration being given to State regulations as to weight distribution per axle so as to make available the use of the general gross weight calculating formula employed by the States in their highway regulations.

It will thus be seen that I have provided a motor vehicle having a continuous undivided body which is supported partly upon a fixed truck and partly upon a trailer truck. Such a unit is comprehended within the definition of most of the States of a 3-axled tractor-semi-trailer unit.

While I have deemed it unnecessary in this diagrammatic illustration and simple description of my invention to make any reference to the location of the engine, it is within my contemplation that the engine may be located within the trailer truck member 13. By so doing, it will be possible to remove the entire trailer truck member whenever repairs are necessary and substitute another unit therefor so that the vehicle as a whole need not be out of operation while repairs are being made.

The embodiment of the invention thus far described is a preferred one. It is, however, subject to modification and one such modification is shown in the diagrammatic views, Figs. 8 and 9. In this modification, the trailer truck is mounted somewhat forwardly of the vehicle body and its wheels are intermediate the wheels carried by the fixed truck.

Referring, first, to Fig. 8, I have shown diagrammatically a chassis 35 having front steerable wheels 36. As in the principal embodiment of the invention, the front wheels are steered by a pinion 37 and rack 38, the latter being connected by links 39 to the wheels. As will be well understood, the pinion 37 will be operated manually from the steering wheel suitably located on the vehicle.

In this modification of the invention, the chassis 35 is provided with rear wheels 40 which may be the driving wheels of the vehicle and which remain in fixed angular relation with the chassis and the body supported thereon.

Intermediate the front and rear wheels, I have mounted a trailer truck member 41 which is connected to the chassis by a universal joint connection 42. The trailer truck 41 is provided with steerable wheels 43. The steering mechanism for these wheels, as in the preferred embodiment of the invention heretofore described, comprises a set of pivotally interconnected levers 44 which are connected to a shaft or bolt 45 carried by the vehicle body.

In this modification, the operation of the trailer truck member and its steerable wheels is substantially the same as in the preferred embodiment of the invention. That is to say, when a change occurs in the angular relation between the chassis and the trailer truck member, the bolt 45 shifts the steering levers 44 so as to change the angular relation of the wheels 43 with respect to the chassis and the body carried thereby.

In Fig. 9, I have illustrated the position of the parts when the front wheels are steered so as to make a left turn. It will be seen that in this arrangement the trailer truck member 41 has swung to the right. As the result of this movement, the bolt or shaft 45 has changed the angular position of the steering levers 44, thereby turning the wheels 43 in the same direction as the front wheels 36 have been turned by manual operation.

Thus, in this modified form of the invention, the same broad principle is carried out of having a relatively fixed truck member with steerable wheels and a trailer truck member also provided with steerable wheels, in which the latter wheels are automatically steered by change in the relative angular position between the body and the trailer truck.

I claim as my invention:

A vehicle comprising a body, a wheeled truck supporting said body in fixed relation, said body having a rearwardly extending overhanging portion, a wheeled truck pivotally connected to said first mentioned truck and supporting said overhanging portion, steering mechanism for the wheels on said pivoted truck comprising a plurality of interconnected levers, a part of said pivoted truck having an arcuate slot, and means on said overhanging portion of the body extending downwardly through said arcuate slot and connected to one of said levers, whereby the wheels on said pivoted truck are steered by changes in the angular relation between said overhanging portion of the body and said pivoted truck.

ORVILLE S. CAESAR.

REFERENCES CITED

The following references are of record in the file of this patent:

UNITED STATES PATENTS

| Number | Name | Date |
|---|---|---|
| 2,154,957 | Pinard | Apr. 18, 1939 |
| 1,666,921 | Warhus | Apr. 24, 1928 |
| 1,250,066 | Wood | Dec. 11, 1917 |
| 77,074 | Moore | Apr. 21, 1868 |

FOREIGN PATENTS

| Number | Country | Date |
|---|---|---|
| 562,857 | French | Sept. 17, 1923 |
| 454,399 | British | Sept. 30, 1936 |
| 258,164 | Italian | Apr. 7, 1928 |